J. MAGOUN.
MOLDING AND PRESSING GLASS.
No. 5,302.
Patented Sept. 25, 1847
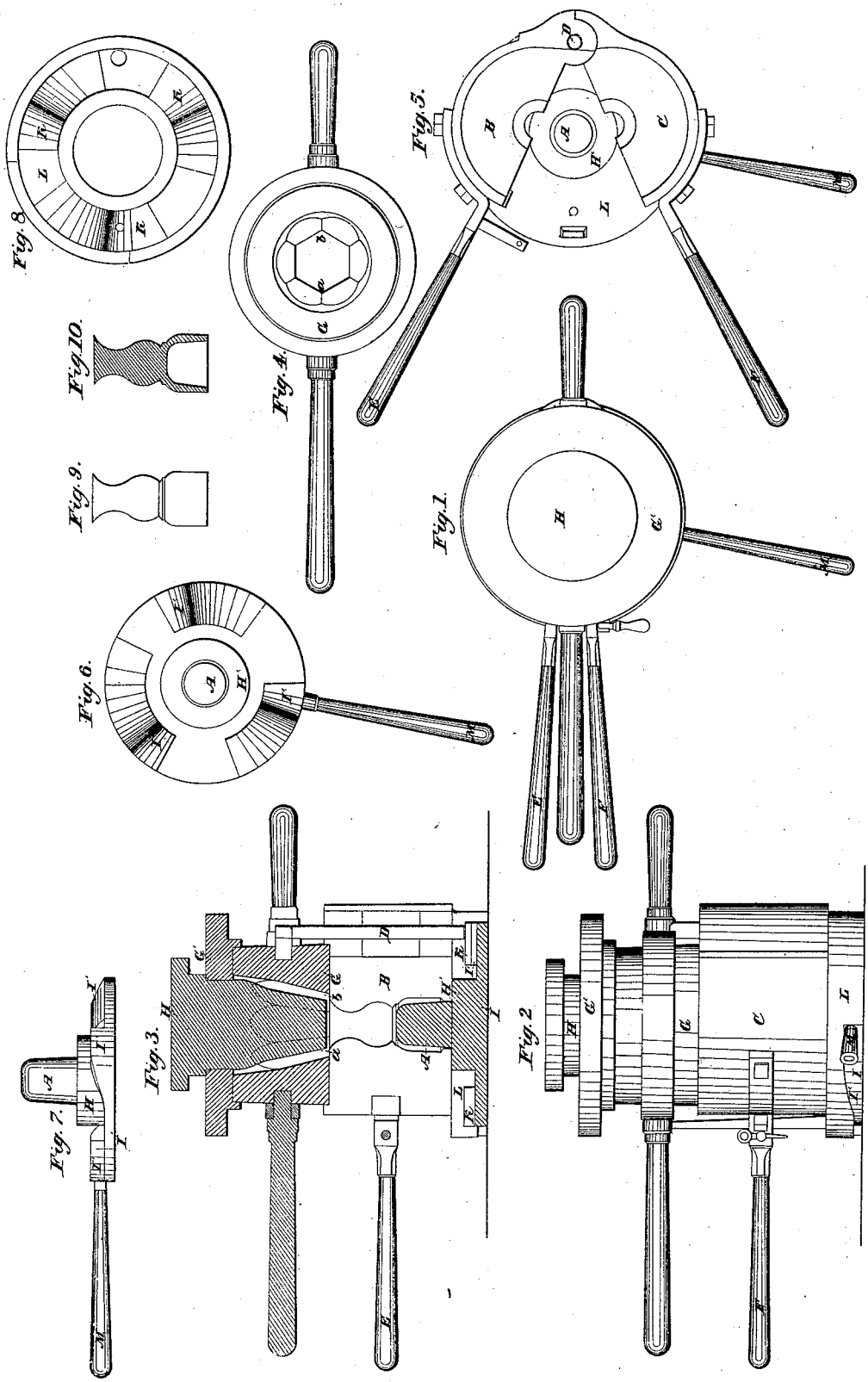

UNITED STATES PATENT OFFICE.

JOS. MAGOUN, OF EAST CAMBRIDGE, MASSACHUSETTS.

MOLDING AND PRESSING GLASS.

Specification of Letters Patent No. 5,302, dated September 25, 1847.

*To all whom it may concern:*

Be it known that I, JOSEPH MAGOUN, of East Cambridge, in the county of Middlesex and State of Massachusetts, have invented certain new and useful Improvements in Molds for Pressing or Maunfacturing Certain Kinds of Glass Articles; and I do hereby declare that the same are fully described and represented in the following specification and accompanying drawings, letters, figures, and references thereof.

Of said drawings Figure 1 denotes a top view of my improved mold. Fig. 2 is a side elevation of it. Fig. 3 is a central, vertical and longitudinal section of it. Fig. 4 is a top view of the central or body part, as it appears when removed from the shank and foot parts on which it rests. Fig. 5 is a top view of the shank and foot parts, and bottom plate on which they rest, the two, shank and foot parts being exhibited as opened apart on their hinge. Fig. 6 is a top view of the cam plate to which the core of the foot of the glass article is attached, as will be hereinafter described. Fig. 7 is a side elevation of it. Fig. 8 is a representation of the lower side of the bottom plate and its cams which operate in contact with the cam plate shown in Figs. 6 and 7.

The manner in which goblets, wine glasses or other articles of like character having a broad circular base or foot, united to their body parts, by a short or long shank or pillar, have heretofore been manufactured by pressure in a mold, has rendered it exceedingly difficult, if not absolutely impossible to cast them without their exhibiting on their external surfaces, what are termed mold marks, that is to say slight elevations of the glass, produced by any two parts of the mold, at their joining or where they come together, or close upon one another. It is often the case that the mold may be so constructed, that some of these marks may be produced, at the angles or places of junction of the flutings of the glass, in which case they are generally imperceptible or do not injure the appearance of the article. But whenever these mold marks appear on any plane or curved or cylindrical surface, they materially injure the beauty of the article and thereby affect its marketable value. In making the foot and shank of a wine glass or goblet or any similar glass article, the positions of the said mold marks on the top surface of the foot, renders it impossible in most instances to remove them by the process of fire polishing, as they cannot be presented in a proper manner to the action of the flame of the furnace. In order to overcome the above difficulty, I make the foot part in the mold in a manner different from what it has ever before been manufactured. By my improved mode of making it, I am enabled afterward to heat it, and spread it out, into the shape of a circular disk, and by so doing completely obliterate the mold marks, on the outer or upper surface. For this purpose instead of casting the foot in the shape of a circular disk I cast it in the shape of a hollow cylinder, or bell shaped (or of any shape approximating thereto) as seen in Figs. 9 and 10, the former being an elevation of the exterior appearance of the foot, while the latter exhibits a vertical and central section of it. After being thus cast, and with joint marks down its outer and inner surface, a workman heats the foot in the furnace, and afterwards in a proper manner, and by the aid of proper tools, as will be readily comprehended by glass workers, opens or spreads out the foot into the shape of a circular disk.

In the drawings A, denotes the core of the foot, B, C, the two halves of the shell which surrounds the core, and forms the shank which connects the body of the glass article with the bottom or base. The said two parts are hinged or jointed together at D (as seen in Fig. 5) and have two handles E, F, extending from them respectively, by which they are opened apart, and closed together as occasion may require. The body part G of the mold is a cylinder of metal, having a matrix cut out, and through it, of the shape to correspond externally, with the body of the wine glass, goblet, or other article to be cast. The lower end or part of this matrix is of a diameter $a$, $b$, larger than the greatest diameter of the cylindrical or ball shaped foot or shank, in order that when the article is cast, it may be drawn out of the mold by raising it upward, in such manner, that the foot and shank will pass through the opening of the lower end of the matrix of the body. The matrix of the body is thus made in a solid piece of metal, one which does not open in two parts like the matrix of the shank. By this mode of making the mold or matrix it produces no joint mark, or marks down on the outside of the glass article cast.

Heretofore it has been customary to make the whole mold with the exception of the crown or cap plate G', and the plunger H of two pieces, parts or halves hinged together, and made to open and close like the two parts B, C, by which the shank is formed. When the shank is fluted, the flutes may be arranged so as to bring the joint marks at their angle of junction. This will render them for all practical purposes, not injurious to the appearance of the article.

The core A of the foot is fixed on the top and at the central part of a cylindrical seat H' which projects upward from, and is attached to the central part of a cam plate I, as seen in Figs. 6 and 7. On this cam plate, and around the seat H', three or any other suitable number of cams I', I', I', are disposed as seen in the drawings. They operate in connection with three similar counter cams K, K, K, disposed and fixed on the underside of the bottom plate L see Fig. 8 which is situated directly over the cam plate. The cylindrical seat H' extends through the bottom plate, and moves on a pivot or bearing, to keep the plates in their proper position when the lower one is moved horizontally. A lever M projects from the periphery of the lower plate. On taking hold of said lever and partially revolving the lower plate, the cams of both plates will move on one another, so as to cause a depression of the core, or a slight downward movement of it through the matrix of the foot. The object of this movement of the core, is to relieve it from the glass foot after it is cast—in order that on opening the two parts of the matrix of the shank, the glass article may be readily lifted out of the mold. The cams may be reversed, so as to cause the rest plate to rise upward while the core is stationary, and thus after the two halves of the matrix of the shank have been opened asunder wide enough to admit the glass article resting on the core to be forced upward by the rest plate, and thus loosened from the body of the mold.

Having thus described my invention that which I claim is—

1. The hereinbefore described manner of making the foot of a glass goblet, or other article of like character, whereby I am enabled to manufacture it without the usual mold marks or impressions of the joints of the mold, viz, by casting the said foot in the mold in the shape of a hollow cylinder, or inverted cup or bell shaped, as above described or any shape approximating thereto and in combination with afterward opening the same, or making it, into a circular disk, by means as above specified.

2. I also claim the hereinbefore described mode of making the mold, in order that the body part of it may be made in one piece, and without any side joint or joints by which any mark or impression of such joint or joints will be produced on the body of the glass article in casting it in the mold, the said mode of making the said mold being to construct the opening of the said bottom of the body of a size sufficient to admit the shank and foot part of the glass article to be drawn upward through it as above explained.

3. I also claim the combination of the two series of cams (as before described) with the bottom plate, cam plate, of the mold and core of the foot, the same being for the purpose of elevating the glass casting from the core, or depressing the core, from the said casting in the manner, and for the purposes as above specified.

In testimony whereof I have hereto set my signature this thirteenth day of March A. D. 1847.

JOSEPH MAGOUN.

Witnesses:
R. H. Eddy,
Joseph N. Howe.